United States Patent
Narita

(10) Patent No.: US 9,784,901 B2
(45) Date of Patent: Oct. 10, 2017

(54) ILLUMINATION LIGHT GUIDE

(71) Applicant: Koito Manufacturing Co., Ltd., Tokyo (JP)

(72) Inventor: Yuho Narita, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 125 days.

(21) Appl. No.: 14/865,452

(22) Filed: Sep. 25, 2015

(65) Prior Publication Data

US 2016/0103269 A1   Apr. 14, 2016

(30) Foreign Application Priority Data

Oct. 10, 2014   (JP) .................. 2014-208875

(51) Int. Cl.
| | |
|---|---|
| *F21V 8/00* | (2006.01) |
| *B60Q 1/26* | (2006.01) |
| *B60Q 1/30* | (2006.01) |
| *F21S 8/10* | (2006.01) |
| *F21Y 103/10* | (2016.01) |
| *F21Y 115/10* | (2016.01) |

(52) U.S. Cl.
CPC ............ *G02B 6/0045* (2013.01); *B60Q 1/26* (2013.01); *B60Q 1/30* (2013.01); *F21S 48/215* (2013.01); *F21S 48/2243* (2013.01); *F21S 48/2268* (2013.01); *F21S 48/2281* (2013.01); *G02B 6/002* (2013.01); *F21Y 2103/10* (2016.08); *F21Y 2115/10* (2016.08); *G02B 6/0016* (2013.01); *G02B 6/0038* (2013.01)

(58) Field of Classification Search
CPC .... G02B 6/0045; G02B 6/002; G02B 6/0038; G02B 6/0016
See application file for complete search history.

(56) References Cited

U.S. PATENT DOCUMENTS

| | | | |
|---|---|---|---|
| 2006/0050282 A1* | 3/2006 | de Lamberterie | .... F21S 48/215 356/452 |
| 2010/0008088 A1* | 1/2010 | Koizumi | .............. B60Q 1/0058 362/235 |

FOREIGN PATENT DOCUMENTS

JP   5210061 B   6/2013

* cited by examiner

*Primary Examiner* — David V Bruce
(74) *Attorney, Agent, or Firm* — Abelman, Frayne & Schwab

(57) ABSTRACT

A light guide of a vehicular lamp includes a first light guide body that guides incident light from a stationary side light source and is formed in a twisted bow shape, and a second light guide body that guides incident light from a movable side light source. A reflection portion is formed on the rear surface of each of the first and second light guide bodies to reflect the incident light toward the front surface, and an emission portion is formed on the front surface to emit the reflected light. First and second side surfaces of each light guide body include a curved surface that appears as a curved line on a cross section of the light guide body. A side step is formed on the first side surface of the first light guide body to reflect the incident light toward the second side surface.

6 Claims, 8 Drawing Sheets

ILLUMINATION LIGHT GUIDE

CROSS-REFERENCE TO RELATED APPLICATIONS

This application is based on and claims priority from Japanese Patent Application No. 2014-208875, filed on Oct. 10, 2014, with the Japan Patent Office, the disclosure of which is incorporated herein in its entirety by reference.

TECHNICAL FIELD

The present disclosure relates to an illumination light guide including a band-shaped light guide body.

BACKGROUND

Conventionally, an illumination light guide has been known in which a plate-shaped or band-shaped light guide body is used in order to increase a light emitting area of a lamp. For example, Japanese Patent No. 5210061 discloses a light guide in which a plate-shaped light guide body is provided inside a lamp cover so as to cause the light of a light source to be incident from one end surface of the light guide body, and so as to guide the incident light in the longitudinal direction to be emitted to the outside from the entire surface area thereof.

SUMMARY

According to the conventional light guide, however, there is a problem in that since the side surfaces of the light guide body are flat planes, a part of the light internally reflected from either the front surface or the rear surface of the light guide body leaks to the outside from the side surfaces. In particular, there is a problem in that when the light guide body is twisted or curved, the light quantity leaking from the side surfaces increases.

Therefore, an object of the present disclosure is to provide an illumination light guide that is capable of increasing a light quantity distributed from an emission portion by suppressing light leakage from a side surface of a light guide body.

In order to solve the problems described above, the present disclosure provides an illumination light guide as follows.

(1) An illumination light guide including a band-shaped light guide body configured to guide incident light in a longitudinal direction. The light guide body includes a front surface and a rear surface which are opposite to each other in a thickness direction, and two side surfaces which are opposite to each other in a width direction. A reflection portion configured to reflect the incident light to the front surface side is formed on the rear surface, an emission portion configured to emit reflected light is formed on the front surface, and each of the two side surfaces includes a curved surface that is indicated as a curved line on a cross section of which a normal corresponds to the longitudinal direction of the light guide body.

(2) The illumination light guide described above, in which the light guide body is formed in a twisted band shape, and an incident portion is formed in one end of the light guide body.

(3) The illumination light guide described above, in which the light guide body is formed in a bow shape which is widened as going away from the incident portion.

(4) The illumination light guide described above, in which the two side surfaces include a first side surface that extends outside the bow shape and a second side surface that extends inside the bow shape, and a side step configured to reflect the incident light toward the second side surface is formed on the first side surface.

(5) The illumination light guide described above, in which an incident step configured to diffuse the incident light in a thickness direction of the light guide body is formed on an end surface of the incident portion.

According to the illumination light guide according to the present disclosure, since the two side surfaces of the light guide body are formed to include a curved surface, the light that is about to exit to the outside from the side surfaces is diffused from the curved surface so as to cause the light to return to the inside of the light guide body. In particular, when the light guide body is twisted or curved in a bow shape, the light quantity leaking from the side surfaces may be reduced, which may increase the light quantity distributed from the emission portion.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
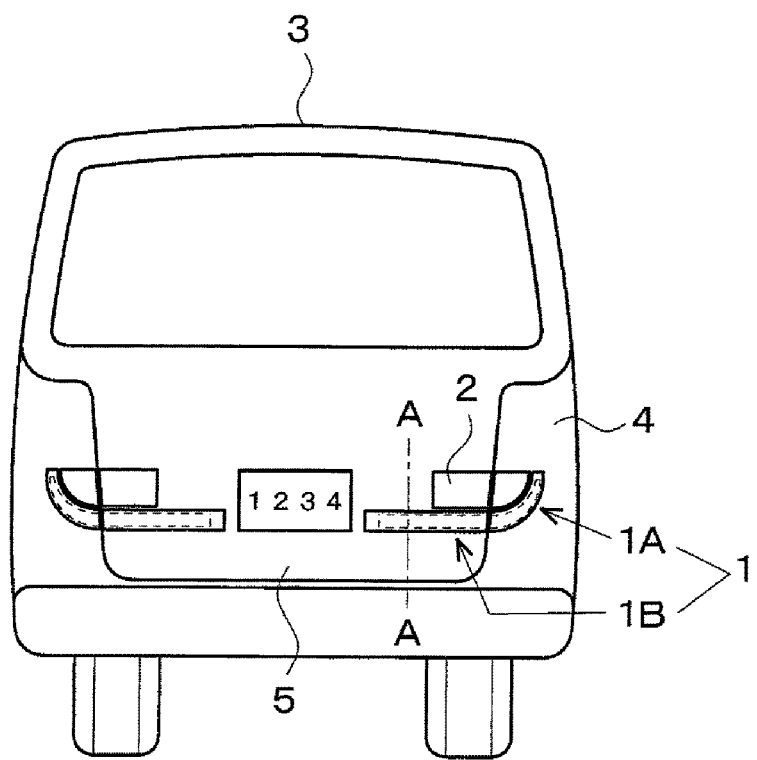
FIG. 1 is a front view illustrating a vehicular lamp according to an exemplary embodiment of the present disclosure.
Figure 3:
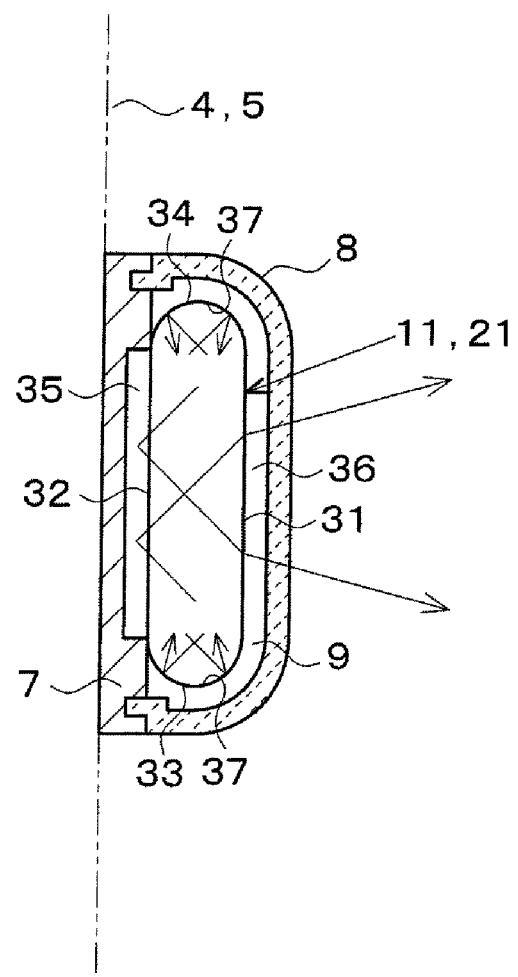
FIG. 3 is a sectional view taken along line A-A, illustrating a cross-sectional shape of each of first and second light guide bodies.

Hereinafter, an exemplary embodiment that embodies the present disclosure in a vehicular lamp will be described with reference to the drawings. A pair of left and right vehicular lamps 1 illustrated in FIG. 1 are installed on a rear portion of a vehicle body 3 together with rear combination lamps 2. Each of the left and right vehicular lamps 1 includes a stationary side lamp 1A attached to a rear vehicle body panel 4 and a movable side lamp 1B attached to a rear door panel 5, and is configured to exhibit a design in which the stationary side lamp 1A and the movable side lamp 1B are continuous in a horizontal direction in a state where the rear door panel 5 is closed. Meanwhile, as illustrated in FIG. 3, in each of the lamps 1A, 1B, a lamp chamber 9 is formed between a body 7 and a light transmission cover 8.

Figure 2:
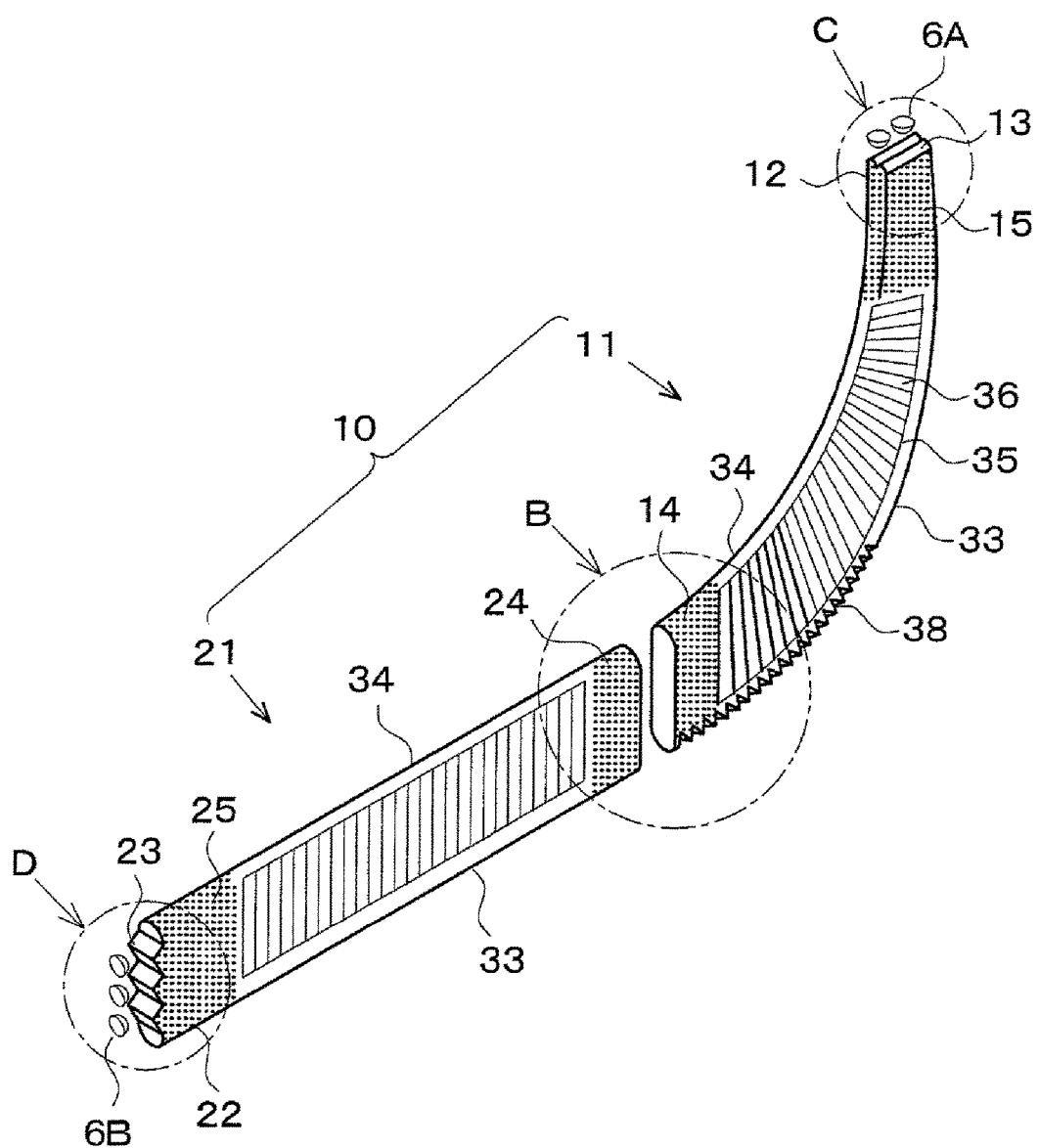
FIG. 2 is a perspective view illustrating an illumination light guide of the vehicular lamp of FIG. 1.

As illustrated in FIG. 2, each of the left and right vehicular lamps 1 is equipped with an illumination light guide 10 that forms a band-shaped light emitting line at the time of lighting. The illumination light guide 10 of the present embodiment includes a band-shaped first light guide body 11 configured to guide the light incident from a stationary side light source 6A, in a longitudinal direction, and a band-shaped second light guide body 21 configured to guide the light incident from a movable side light source 6B, in the longitudinal direction. The first and second light guide bodies 11, 21 are installed in the lamp chambers 9 of the lamps 1A, 1B, respectively. The first light guide body 11 includes an incident portion 12 in the upper end thereof, and is formed in a twisted bow shape which is widened as going away from the incident portion 12 downwardly. The second light guide body 21 includes an incident portion 22 in the end at a side opposite to the first light guide body 11 and is formed in a linear shape in which respective portions have the same width.

The first and second light guide bodies 11, 21 are connected with each other such that the end surfaces at the sides opposite to the incident portions 12, 22 face each other across a boundary between the vehicle body panel 4 and the door panel 5, and embossed portions 14, 24 are formed on the outer circumferences of the connection portions of the first and second light guide bodies 11, 21, respectively. In the incident portion 12 of the first light guide body 11, incident steps 13 are formed on the end surface thereof, and an embossed portion 15 is formed on the outer circumference surface thereof. Similarly, in the incident portion 22 of the second light guide body 21, incident steps 23 are formed on the end surface thereof and an embossed portion 25 is formed on the outer circumferential surface thereof. In addition, by the embossed portions 14, 15, 24, 25, point lighting in the opposite ends of the light guide bodies 11, 21 is alleviated.

Figure 7:
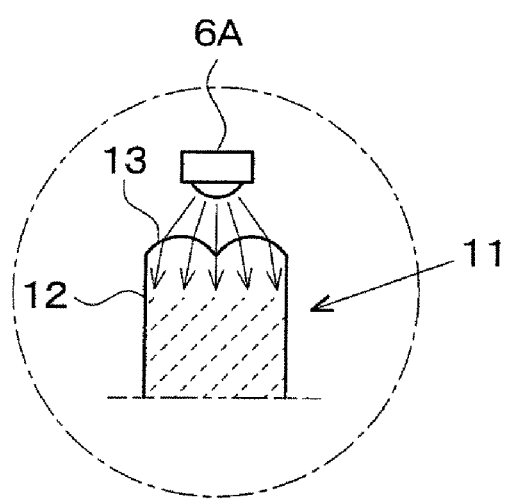
FIG. 7 is an enlarged sectional view of a portion C in FIG. 2, illustrating incident steps of the first light guide body.
Figure 8:
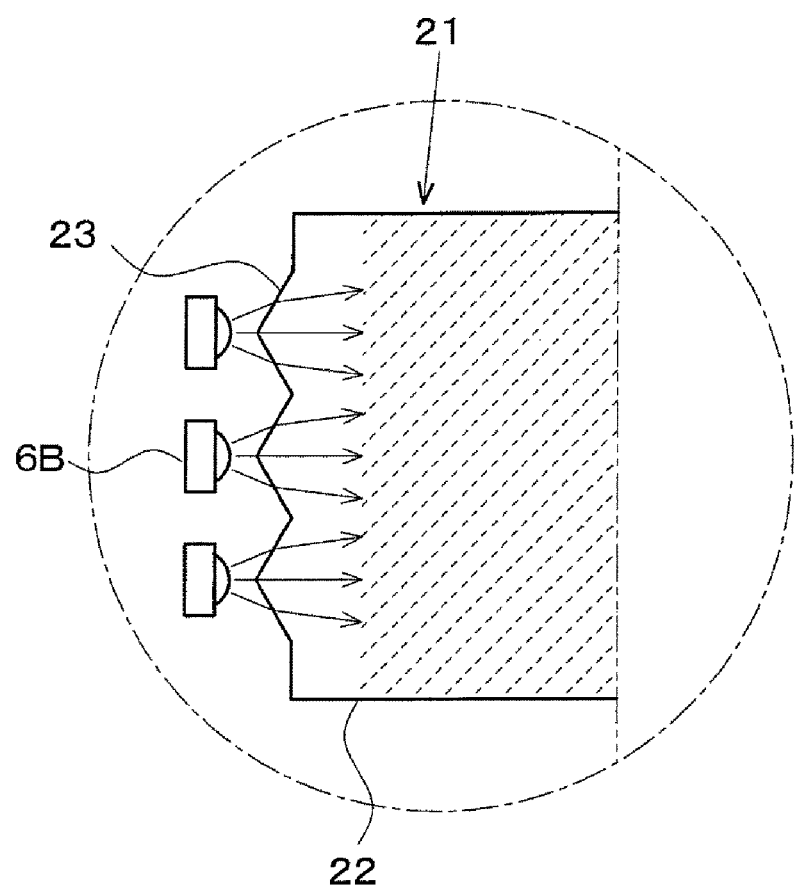
FIG. 8 is an enlarged sectional view of a portion D in FIG. 2, illustrating incident steps of the second light guide body.

As illustrated in FIG. 7, the incident steps 13 of the first light guide body 11 are cylindrical steps, in which the boundary between the incident steps 13 extends in the width direction of the light guide body 11. The incident steps 13 diffuse the incident light from the stationary side light source 6A in the thickness direction of the light guide body 11. As illustrated in FIG. 8, the incident steps 23 of the second light guide body 21 are formed in prismatic shapes, respectively, in which the boundary between each two adjacent incident steps extends in the thickness direction of the light guide body 11. The incident steps 23 diffuse the incident light from the movable side light sources 6B in the width direction of the light guide body 21. LEDs are used for the light sources 6A, 6B, and light lines peculiar to the LEDs are eliminated by the light diffusion effect of the incident steps 13, 23. Meanwhile, the number of LEDs is not particularly limited, and discharge lamps or filaments may also be used in place of the LEDs.

Figure 4:
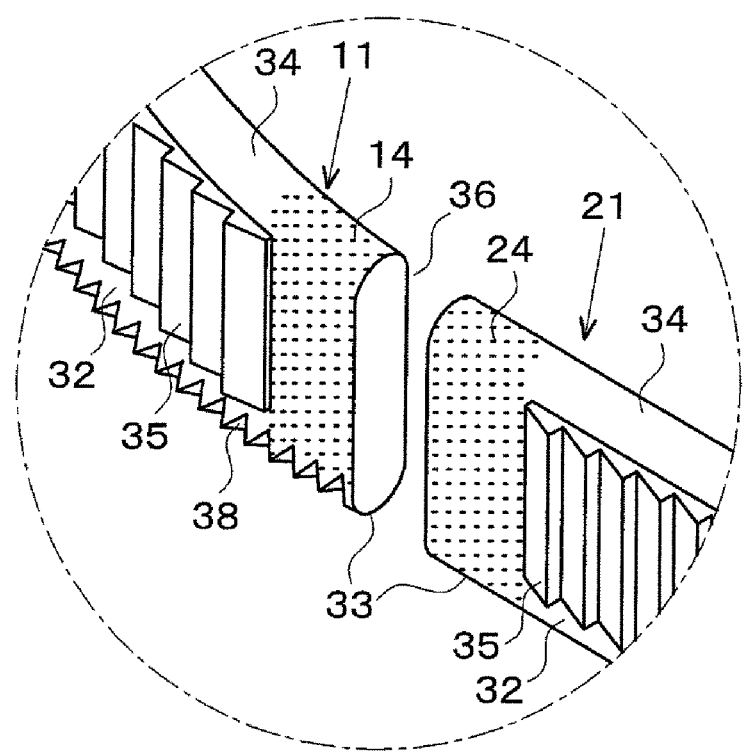
FIG. 4 is an enlarged perspective view of a portion B in FIG. 2, illustrating a connection portion between the first and second light guide bodies.

As illustrated in FIGS. 3 and 4, each of the first and second light guide bodies 11, 21 includes a front surface 31 and a rear 32 that are opposite to each other in the thickness direction, and two side surfaces 33, 34 that are opposite to each other in the width direction. Each of the first and second light guide bodies 11, 21 is wholly molded in an oval shape in cross-section from a transparent synthetic resin. On the rear surface 32, a reflection portion 35 is formed to reflect the incident light toward the front surface 31, and on the front surface 31, an emission portion 36 is formed to emit the reflected light to the outside. Each of the two side surfaces 33, 34 includes a curved surface 37 which is indicated as a curved line on the cross section of each of the light guide bodies 11, 21 (a cross-section of which the normal corresponds to the longitudinal direction of the light guide body 11 or 21). The side surfaces 33, 34 function to internally reflect the incident light by the curved surfaces 37 so that the incident light is diffused to the inside of the light guide bodies 11, 21. Meanwhile, the front surface 31 and the rear surface 32 are indicated as straight lines on the cross sections of the light guide bodies 11, 21, respectively.

Figure 5:
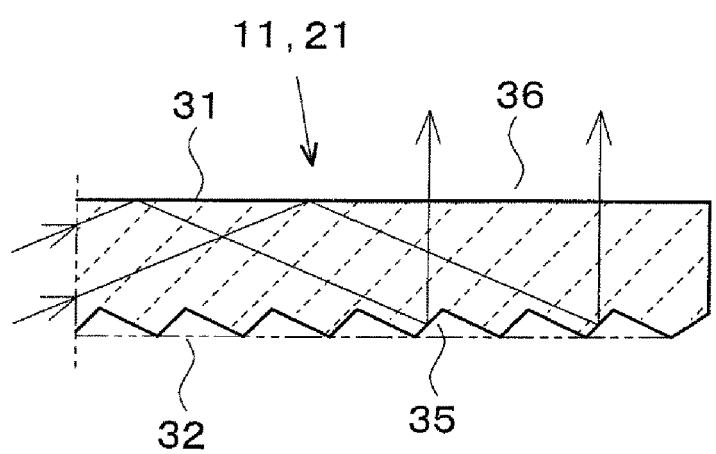
FIG. 5 is a sectional view illustrating an optical action of a reflection portion of each of the first and second light guide bodies.
Figure 6:
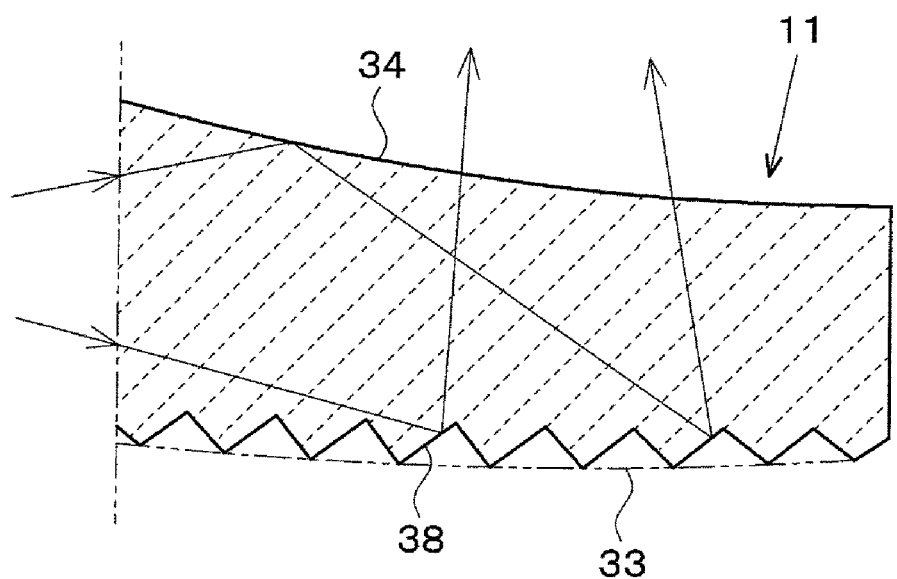
FIG. 6 is a sectional view illustrating an optical action of side steps of the first light guide body.

As illustrated in FIGS. 4 and 5, the reflection portions 35 include a plurality of prisms that extend in the width direction of the light guide bodies 11, 21. In place of the prisms, the reflection portions 35 may be formed by an aluminum vapor deposition film. As illustrated in FIGS. 4 and 6, on the lower side surface 33 of the first light guide body 11, that is, on a first side surface 33 extending outside the light guide body 11 which is formed in the bow shape, side steps 38 are formed in the shape of saw teeth. The side steps 38 are formed on the lower end portion of the twisted first light guide body 11 and reflect the incident light toward the second side surface 34 that extends inside the bow shape, thereby eliminating a dark part from the lower end portion of the second side surface 34. Meanwhile, the emission portion 36 of the first light guide body 11 is formed as a smooth surface that is twisted as a whole.

According to the illumination light guide 10 of the present exemplary embodiment configured as described above, since the side surfaces 33, 34 of the first and second light guide bodies 11, 21 are formed as curved surfaces 37, the light that is about to exit to the outside from the side surfaces 33, 34 may be diffused by the curved surfaces 37 so that the light returns to the inside of the light guide bodies 11, 21. Accordingly, even if the first light guide body 11 is molded in a twisted band shape or curved in a bow shape according to the shape of the rear vehicle body panel 4, the light quantity leaking from the side surfaces 33, 34 can be reduced and thus, the light quantity distributed from the emission portion 36 can be increased.

In particular, since the side steps 38 are formed on the first side surface 33 of the first light guide body 11, a dark part in the vicinity of the lower end portion of the second side surface in the emission portion 36 of the first light guide body 11 may be eliminated by the light reflected from the steps 38 so that respective portions of the first light guide body 11 may emit light uniformly. In addition, since the incident steps 13, 23 alleviate the light lines of the first and second light guide bodies 11, 21, and at the same time, the embossed portions 14, 15, 24, 25 prevent point lighting of the respective portions of the light guide bodies 11, 21, light emission may be performed such that the entire vehicular lamp 1 has a good appearance at the time of lighting.

In the exemplary embodiment described above, the side surfaces 33, 34 of the light guide bodies 11, 21 are formed as outwardly bulging curved surfaces 37. On the contrary, however, the side surfaces 33, 34 may be formed as inwardly recessed curved surfaces. In addition, in the exemplary embodiment described above, the incident steps 13, 23 are formed in one end of each of the light guide bodies 11, 21. In consideration of the length or shape of each of the light guide bodies, the incident steps may be formed on both ends of each of the light guide bodies together with a light source.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An illumination light guide comprising:
a band-shaped light guide body configured to guide incident light in a longitudinal direction, the light guide body including a front surface and a rear surface which are opposite to each other in a thickness direction, and two side surfaces which are opposite to each other in a width direction,
wherein a reflection portion configured to reflect the incident light to the front surface side is formed on the rear surface, an emission portion configured to emit reflected light is formed on the front surface, and each of the two side surfaces includes a curved surface that is indicated as a curved line on a cross section of which a normal corresponds to the longitudinal direction of the light guide body, and
the light guide body is formed in a twisted band shape, and an incident portion is formed in one end of the light guide body.

2. The illumination light guide of claim 1, wherein the light guide body is formed in a bow shape which is widened as going away from the incident portion.

3. The illumination light guide of claim 2, wherein the two side surfaces include a first side surface that extends outside the bow shape and a second side surface that extends inside the bow shape, and a side step configured to reflect the incident light toward the second side surface is formed on the first side surface.

4. The illumination light guide of claim 1, wherein an incident step configured to diffuse the incident light in a thickness direction of the light guide body is formed on an end surface of the incident portion.

5. The illumination light guide of claim 2, wherein an incident step configured to diffuse the incident light in a thickness direction of the light guide body is formed on an end surface of the incident portion.

6. The illumination light guide of claim 3, wherein an incident step configured to diffuse the incident light in a thickness direction of the light guide body is formed on an end surface of the incident portion.

* * * * *